(12) United States Patent
Kurtas et al.

(10) Patent No.: US 7,333,279 B2
(45) Date of Patent: Feb. 19, 2008

(54) SYSTEM AND METHOD FOR DRIVE-SIDE GUARANTEE OF QUALITY OF SERVICE AND FOR EXTENDING THE LIFETIME OF STORAGE DEVICES

(75) Inventors: Erozan Kurtas, Pittsburgh, PA (US); Mehmet Erden, Pittsburgh, PA (US); Xueshi Yang, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 247 days.

(21) Appl. No.: 11/085,845

(22) Filed: Mar. 22, 2005

(65) Prior Publication Data

US 2006/0215290 A1    Sep. 28, 2006

(51) Int. Cl.
G11B 27/36    (2006.01)
G11B 21/02    (2006.01)

(52) U.S. Cl. .......................................... 360/31; 360/75
(58) Field of Classification Search ................... None
See application file for complete search history.

(56) References Cited

U.S. PATENT DOCUMENTS

2006/0103960 A1* 5/2006 Imamira et al. ............... 360/31

OTHER PUBLICATIONS

W. Marcus. "An Architecture for QoS Analysis and Experimentation," IEEE/ACM Transactions on Networking, vol. 4, No. 4, Aug. 1996, pp. 597-603.

H. J. Chao et al.; "Design of a Generalized Priority Queue Manager for ATM Switches," IEEE *Journal on Selected Areas in Communications*, vol. 15, No. 5, Jun. 1997, pp. 867-880.

R. Wijayaratne et al.; "Integrated QOS Management for Disk I/O," IEEE Transactions, 1999, pp. 487-492.

Markaki, M. and I.S. Venieris.; "A Novel Bugger Management Scheme for CBQ-based IP Routers in a Combined IntServ and DiffServ Architecture," IEEE Transactions 2000, pp. 347-352.

Cheung, S. and Pencea, C.; "Pipelined Sections: A New Buffer Management Discipline for Scalable QoS Provision," IEEE INFOCOM 2001, pp. 1530-1538.

F. Yu et al.; "QoS-Adaptive Proxy Caching for Multimedia Streaming Over the Internet,"IEEE Transactions 2003, pp. 257-269.

(Continued)

*Primary Examiner*—William Korzuch
*Assistant Examiner*—Daniell L. Negrón
(74) *Attorney, Agent, or Firm*—Westman, Champlin & Kelly, P.A.

(57) ABSTRACT

A storage device has a storage medium, a plurality of read-write mechanisms, a quality monitoring and book-keeping unit and a scheduling unit. The plurality of read-write mechanisms is coupled to the storage medium. The quality monitoring and book-keeping unit is coupled to the plurality of read-write mechanisms and is adapted to monitor at least one performance parameter associated with each read-write mechanism during operation. The scheduling unit is coupled to the quality monitoring and book-keeping unit. The scheduling unit is adapted to rank each of the plurality of read-write mechanisms according to the at least one performance parameter and to responsively schedule use of a read-write mechanism according to its rank.

13 Claims, 9 Drawing Sheets

OTHER PUBLICATIONS

Chen, X. and Mohapatra, P.; "Performance evaluation of Service Differentiating Internet Servers," IEEE Transactions 2002, pp. 1368-1375.

S. Shamala et al.; "Pro-Active QoS Scheduling Algorithms for Real-Time Multimedia Applications in Communication System," IEEE Transactions 2000, pp. 466-471.

S. Heithecker et al., "A Mixed QOS SDRAM Controller for FPGA-Based High-End Image Processing," Technical University of Braunschweig, Institute for Computer and Communication Network Engineering, IEEE Transactions 2003, pp. 322-327.

Ying-Dar Lin et al.; "QoS Routing Granularity in MPLS Networks," IEEE Communications Magazine, Jun. 2002, pp. 58-65.

Wu, J. and Brandt, S.; "Storage Access Support for Soft Real-Time Applications," Proceedings of the 10th Real-Time and embedded Technology and Applications Symposium, 2004, pp. 1-8.

S. Uttamchandani et al.; "DecisionQos: An Adaptive, Self-Evolving QoS Arbitration Module for Storage Systems," Proceedings of the 5th IEEE Int'l Workshop on Policies for Distributed Systems and Networks, 2004, pp. 1-10.

Bong-Jun Ko et al.; "Scalable Service Differentiation in a Shared Storage Cache," IEEE Proceedings of the 23rd Int'l Conf. On Distributed Computing Systems, 2003, pp. 1-10.

W. Aref et al., "Scalable QoS-Aware Disk Scheduling," IEEE Proceedings of the International Database Engineering and Applications Symposium, 2002, pp. 1-10.

* cited by examiner

SYSTEM AND METHOD FOR DRIVE-SIDE GUARANTEE OF QUALITY OF SERVICE AND FOR EXTENDING THE LIFETIME OF STORAGE DEVICES

FIELD OF THE INVENTION

The present invention relates generally to data storage devices, and more particularly, to storage devices adapted to guarantee a quality of service for data transmission and storage.

BACKGROUND OF THE INVENTION

Data storage devices typically store data on a storage medium, which will be accessed by a read-write mechanism many times over the life of the storage device. As used herein, the term "storage device" refers to any apparatus adapted to store data electronically or magnetically, including disc drives, flash memory, read-only memory (ROM), programmable ROM (PROM), erasable PROM (EPROM), electrically erasable PROM (EEPROM), probe storage devices, and the like.

Over the lifetime of a storage device, a read-write mechanism of the storage device can experience wear and tear, causing a gradual deterioration of the performance of the read-write mechanism. Deterioration of the read-write mechanism can include reduced signal amplitude, undesired inter-symbol (or inter-track) interference, excessive noise, unanticipated changes in magnetic field area, misalignment of the read/write mechanism, and numerous other problems, any of which can lead to data errors and/or to failure of the storage device. For example, shock events, such as physically dropping the storage device, can cause the read-write mechanism to contact the storage medium or can cause misalignment of the read-write mechanism. Additionally, thermal events, such as thermal aspersities, can cause wear in the read-write mechanism. As used herein, the term "thermal asperity" refers to a large voltage generated in the read-write mechanism by contact with the storage medium of the storage device.

Deterioration of the read-write mechanism leads to degradation of the signal quality of an associated read channel, which directly translates into inferior quality of service (QoS) and shortened device lifetime of the storage device. Quality of service (QoS) refers to a guarantee of a minimum standard of quality for information contained within a signal. Devices that support QoS-guarantees typically provide different levels of quality depending on which type of data is being processed, such as voice, data or video. For example, in one instance, a higher quality of service may be required for video storage and retrieval (e.g. constant stream of data) than is required for sending and receiving other types of data (such as sound). In some communication protocols, quality of service is maintained using a combination of parity bit checking, error checking, encoding and handshaking. Typically, QoS is maintained using software and/or hardware of a host system. Unfortunately, read mechanism deterioration can undermine QoS if information received under QoS-guarantees is stored on a storage device using a degraded read-write mechanism, which can introduce errors into the information stream due to physical deterioration.

There is ongoing need for storage devices that can support QoS guarantees for different types of information. Embodiments of the present invention provide solutions to these and other problems, and offer other advantages over the prior art.

SUMMARY OF THE INVENTION

A storage device has a storage medium, a plurality of read-write mechanisms, a quality monitoring and book-keeping unit and a scheduling unit. The plurality of read-write mechanisms is coupled to the storage medium. The quality monitoring and book-keeping unit is coupled to the plurality of read-write mechanisms and is adapted to monitor at least one performance parameter associated with each read-write mechanism during operation. The scheduling unit is coupled to the quality monitoring and book-keeping unit. The scheduling unit is adapted to rank each of the plurality of read-write mechanisms according to the at least one performance parameter and to responsively schedule use of a read-write mechanism according to its rank.

In one embodiment, a method for guaranteeing a quality of service in a storage device is provided. A performance parameter for each of a plurality of read-write mechanisms of the storage device is monitored using a quality monitoring and book-keeping unit. A quality indicator that is representative of the monitored performance parameter is calculated for each of the plurality of read-write mechanisms. Each calculated quality indicator is associated to its read-write mechanism. One or more of the plurality of read-write mechanisms are scheduled for use using a scheduling unit according to the assigned quality indicator.

In another embodiment, storage device has a storage medium, one or more read-write mechanisms, a quality monitoring and book-keeping unit and a scheduling unit. The storage medium is divided into a plurality of partitions. The one or more read-write mechanisms are associated with the plurality of partitions and adapted to read and write data to and from the plurality of partitions. The quality monitoring and book-keeping unit is adapted to monitor an operational quality of each partition of the plurality of partitions and to associate each partition with its monitored operational quality. The scheduling unit is adapted to schedule use of a partition of the plurality of partitions according to its associated operational quality.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
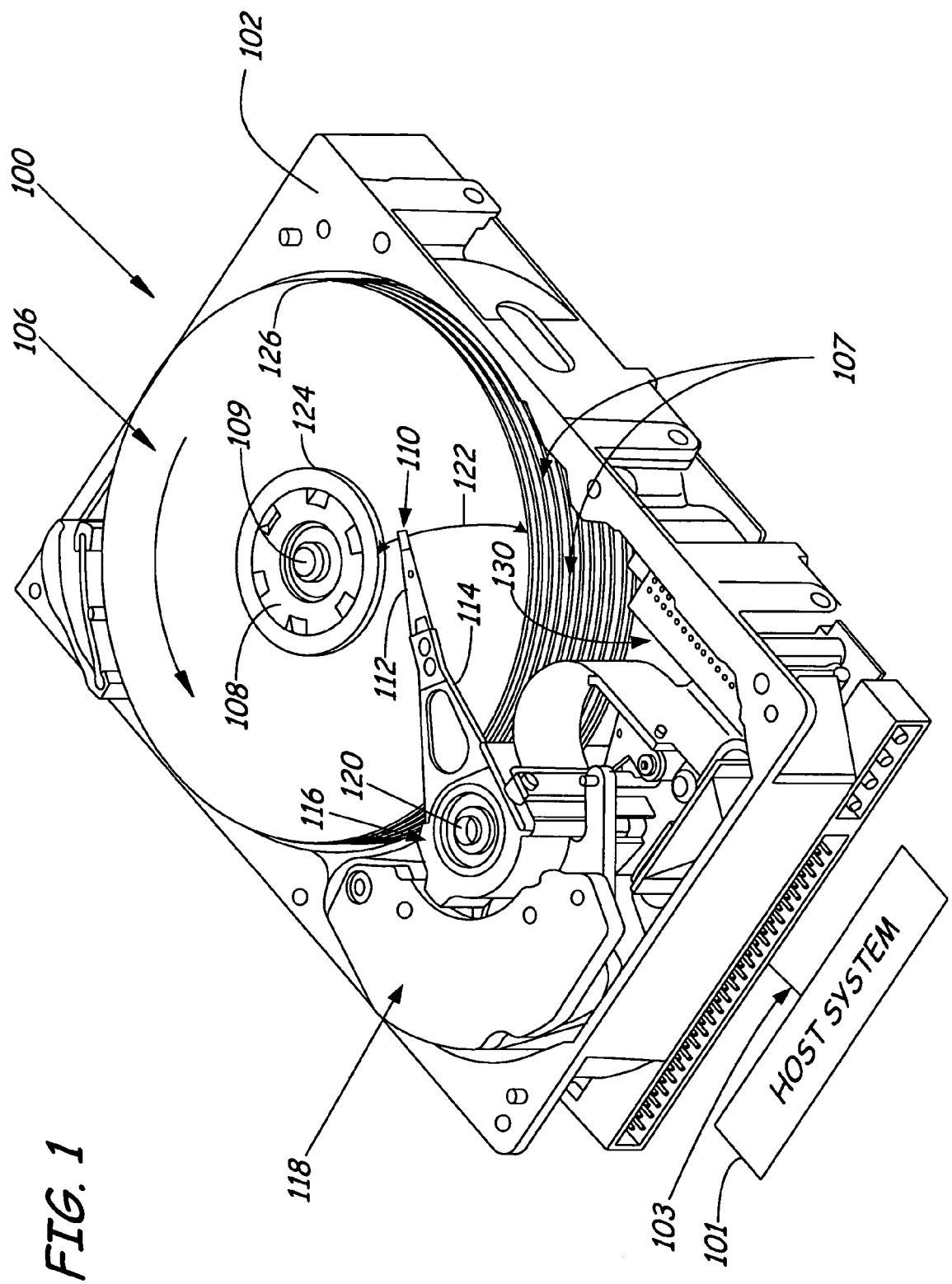
FIG. 1 is an isometric view of a disc drive on which embodiments of the present invention may be employed.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated disc head slider 110 to which a read/write transducer (not shown) is mounted, for communication with the disc surface.

In the example shown in FIG. 1, disc head sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached disc head sliders 110 (and associated read/write transducers) about a pivot shaft 120 to position the disc head slider 110 over a desired data track along an arcuate path 122 between a disc inner diameter 124 and a disc outer diameter 126. Voice coil motor 118 is driven by electronics 130 based on signals generated by heads 110 and a host system 101. The host system 101 is coupled to the disc drive 100 via an interface 103. Data and control signals pass from the host system 101 to the disc drive 100 over the interface 103.

In general, the present invention provides systems and methods for maximizing a lifetime of a storage device by monitoring readback signal quality, tracking read-write mechanism performance, and scheduling the read-write mechanisms to ensure a desired QoS. The present invention can be applied to any type of storage device that has a read-write mechanism, such as a probe tip, a magnetic read-write head, a laser-optical read-write mechanism, and the like. As used herein, the term "read-write mechanism" refers to any element within a storage device adapted to read data from and/or write data to a storage medium.

Figure 2:
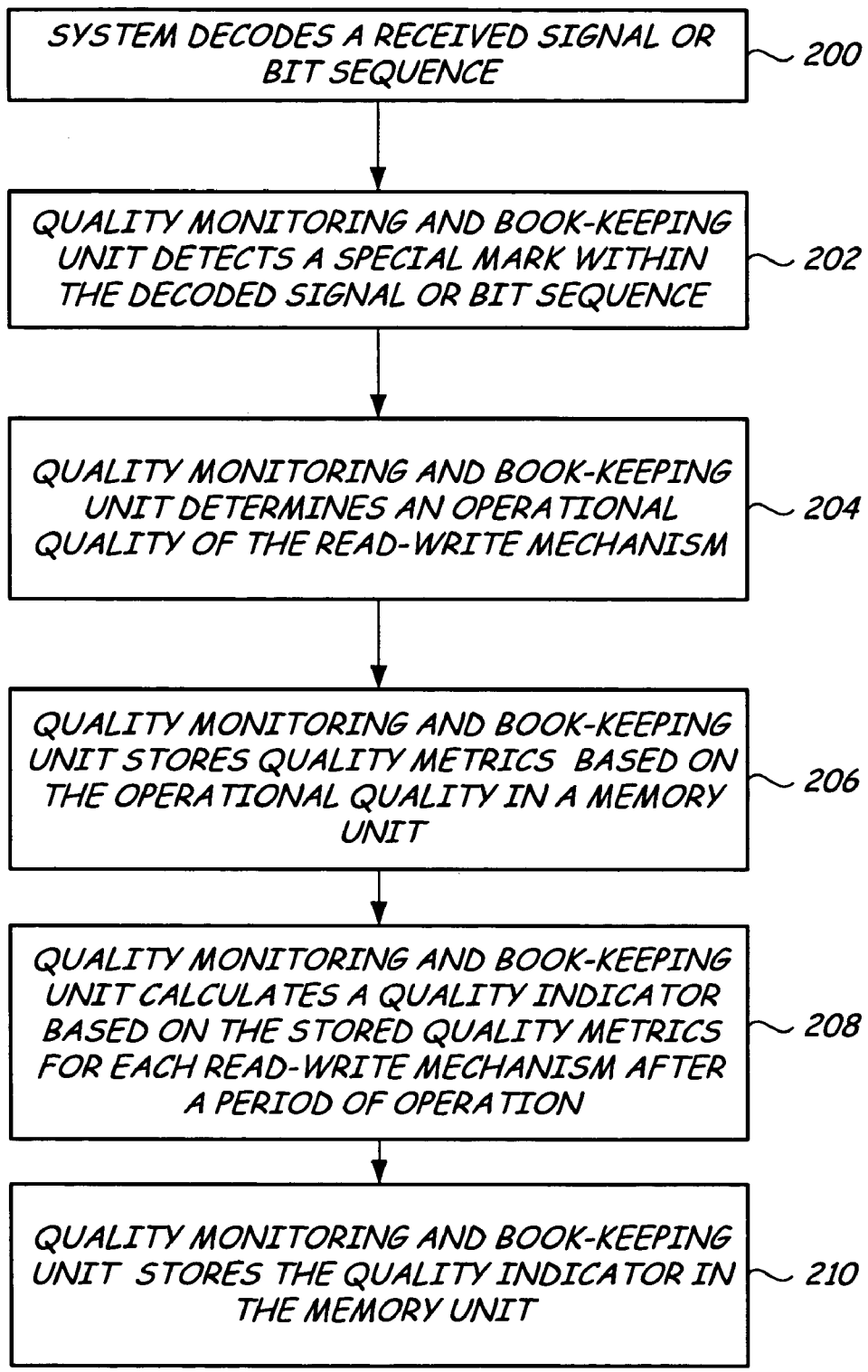
FIG. 2 is a simplified flow diagram of a process for determining a quality indicator for each read-write mechanism of a storage device according to an embodiment of the present invention.

FIG. 2 is a simplified flow diagram of a process for determining a quality indicator for each read-write mechanism of a storage device. The read-write mechanism can be a magnetic read-write head, a probe tip, or any other mechanism adapted to read and to write data to and from a storage medium of a storage device. First, the system decodes a received signal or data sequence (step 200). The decoding process may include adjusting an adaptive gain controller (AGC) and timing recovery blocks using a preamble portion of the received signal or data sequence. A quality monitoring and book-keeping unit detects a special mark within the decoded signal or data sequence (step 202). The quality monitoring and book-keeping unit determines an operational quality of a read-write mechanism that has read the special mark (step 204). The operational quality can be determined based on a correlation between the detected special mark and the actual special mark, based on a number of errors in the special mark, based on a path metric of the special mark, or based on other indicators. The quality monitoring and book-keeping unit stores quality metrics for each read-write mechanism in a memory unit (step 206). The quality metrics are based on the determined operational quality of each read-write mechanism. The quality metrics can include numbers of errors of a read-write mechanism, log-likelihood ratios, special mark detection errors, and the like. Finally, after a period of operation (such as after 100 read-write accesses), a quality indicator for each read-write mechanism is computed based on the quality metrics (step 208), and the quality indicator is stored in the memory unit (step 210). The quality indicator is representative of an operational quality or operational reliability of the read-write mechanism.

The process for extracting the operational quality/reliability of each read-write mechanism can vary slightly according to the algorithm used for channel detection. In general, the quality monitoring and book-keeping unit monitors an operational quality of each read-write mechanism. This operational quality can be a number of output errors for the special mark, for example. In one embodiment, the correlation of the received signal corresponding to the special mark and the decoded special mark is used to extract the operational quality for the read-write mechanism, such as numbers of errors. This method has a low complexity.

If a Viterbi-like sequence detection method is used to detect the special mark for each read-write mechanism, a minimum path metric for each read-write mechanism can be examined at the end of the special mark detection process. An operational quality of each read-write mechanism can be determined based on this minimum path metric. For example, the read-write mechanisms can be ranked in ascending order based on their respective path metrics or an average of the path metrics over a period of time. This ranked order can then be used by a scheduler to schedule use of each read-write mechanism. The complexity of the Viterbi implementation depends on the equalizer target response employed for each channel, and can range from medium to high.

In another embodiment, the operational quality can be based on a number of errors in the decoded special mark. The complexity of this method depends on what kind of detection method is used. If the detection method is a simple threshold detector, the complexity will be low. However, if it is a Viterbi-like detector, the complexity might range from medium to high. In another embodiment, the Log-Likelihood Ratios (LLRs) from a Soft Input Soft Output (SISO) detector, such as a Soft Output Viterbi Algorithm (SOVA), are used to decide on the quality of the read-write mechanism during the detection of special mark. The complexity of SISO detectors can be very high compared to conventional Viterbi detectors.

In one embodiment, the robustness of the quality/reliability detection can be improved by utilizing a combination of one or more of the number of errors, minimum path metrics, LLRs, threshold, and correlation for each read-write mechanism. For example, the quality/reliability detection can utilize both the path metrics of each read-write mechanism and also a number of errors during detection of the special mark for each read-write mechanism to extract the operational quality and to determine the quality metric. The complexity of this method is a sum of the complexities of the methods used.

As a result of this monitoring process, the associated quality metrics, such as a number of errors, LLRs, and the like, are recorded in the memory unit, which tracks the operation reliability of each read-write mechanism. As previously described with respect to step 208 above, after a certain period of operation (such as after 100 read-write accesses), a quality indicator $Q(i)$ is calculated for each read-write mechanism. For example, if a number of special mark detector errors were employed as the quality metric, the quality indicator $Q(i)$ can be calculated to be proportional to an average number of special mark detection errors. The average number of errors can be normalized over a number of read/write accesses (M), such as over the last 100 read-write accesses.

It should be understood that the specific order of steps in FIG. 2 can vary and that steps can be combined, depending on the implementation. For example, the extraction of the operational quality (step 204) and the detection of the special mark (step 202) can be combined into a single step. Additionally, the quality metrics can be temporarily stored in a buffer of the quality monitoring and book-keeping unit until sufficient data is available to calculate the quality indicator based on the quality metrics. Then the quality metrics and the quality indicator can be stored in the memory.

Figure 3:
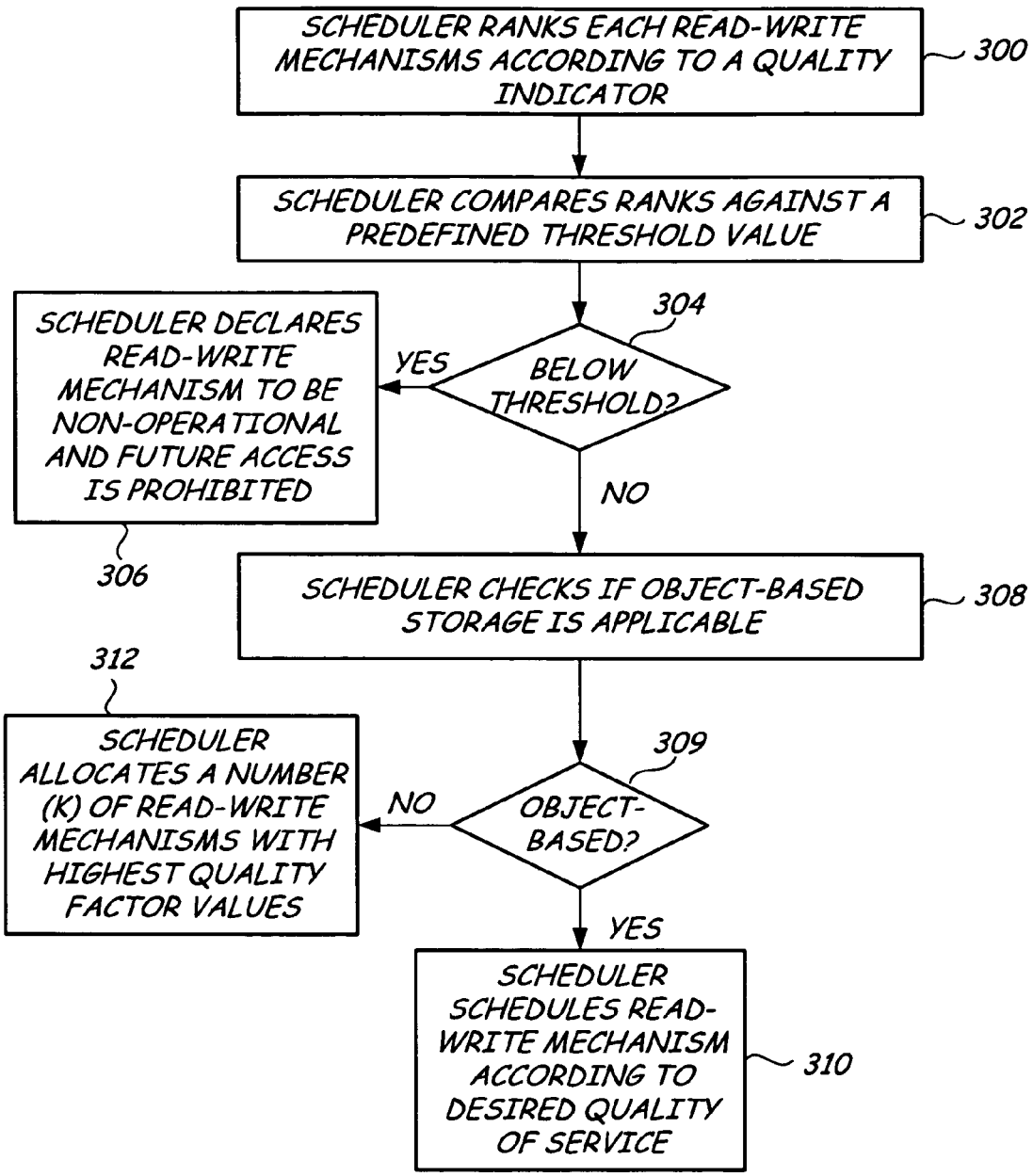
FIG. 3 is a simplified flow diagram of a process for scheduling read-write mechanisms for read-write operations in the storage device based on a quality indicator according to an embodiment of the present invention.

FIG. 3 is a simplified flow diagram of a scheduling strategy for scheduling read-write mechanisms of a storage device according to an embodiment of the present invention. The quality indicator matrix $Q(i)$, where $i=1, \ldots, N$, can be utilized to facilitate the scheduling of the read-write mechanisms of a storage device. A read-write mechanism scheduler ranks each read-write mechanism of the storage device according to its associated quality indicator $Q(i)$ (step 300). The ranks are then compared against a pre-determined threshold quality (step 302). If a read-write mechanism has a rank that falls below the pre-determined threshold quality (step 304), the read-write mechanism is declared non-operational, and future access via that read-write mechanism is prohibited (step 306). For example, if the quality indicator (Q) of a read-write mechanism falls below a pre-defined threshold (q), the data associated with read-mechanism are moved to other read-write mechanisms that have acceptable quality indicator (Q) values. In addition, read mechanism with the low quality indicator is declared non-operational and its future access is prohibited. This strategy maximizes the device lifetime by preventing the storage device from failing due only to a few malfunctioning read-write mechanisms.

If a read-write mechanism has a rank that is above the pre-determined threshold quality (step 304), the scheduler checks to see if object-based storage is applicable (step 308). If object-based storage is applicable (step 309), the scheduler schedules the read-write mechanisms according to the desired QoS (step 310). For example, if the current object is critical to the end user, the system can demand the best available reliability or QoS. The scheduler can then schedule the read-write mechanisms that possess the best Q values to store the object. In another scenario, if the access data rate is more important than reliability for the current object, the scheduler activates all available read-write mechanisms with acceptable Q values to write the object. Subsequently, when the object is accessed, the device can read back the object faster using all available read-write mechanisms simultaneously. In general, the read-write mechanism (i) is scheduled if a cost function $f(x,y)$ is minimized based on the quality factor, such that $f(Q(i))$ is minimized.

If object-based storage is not applicable (step 309), the scheduler allocates a number (k) of read-write mechanisms with the highest quality indicator values (step 312). For example, if during normal operation, a number (K) of read-write mechanisms (N) (where K is less than N) is required for writing, the system allocates the number (K) of read-write mechanisms that are available for writing with the highest Q values. If the reliability degradation of each read-write mechanism is proportional to the access frequency, the scheduler distributes the access frequency of the read-write mechanisms over the total number (A) of available read-write mechanisms, guaranteeing that the end user always experiences the highest reliability available from the device.

It should be understood that the order of the steps described with respect to FIG. 3 above can vary, depending on the implementation. For example, steps 302 to 306 can be performed separately from the ordinary read-write scheduling of the read-write mechanism, such as when the storage device is not being accessed. Thus, when a write instruction is received, the failed or failing read-write mechanisms are already removed from service, thereby allowing the scheduler to schedule read-write mechanisms for use based solely on the ranking of the active read-write mechanisms. Additionally, scheduler can check if object-based storage is required before ranking the active read-write mechanisms.

Figure 4:
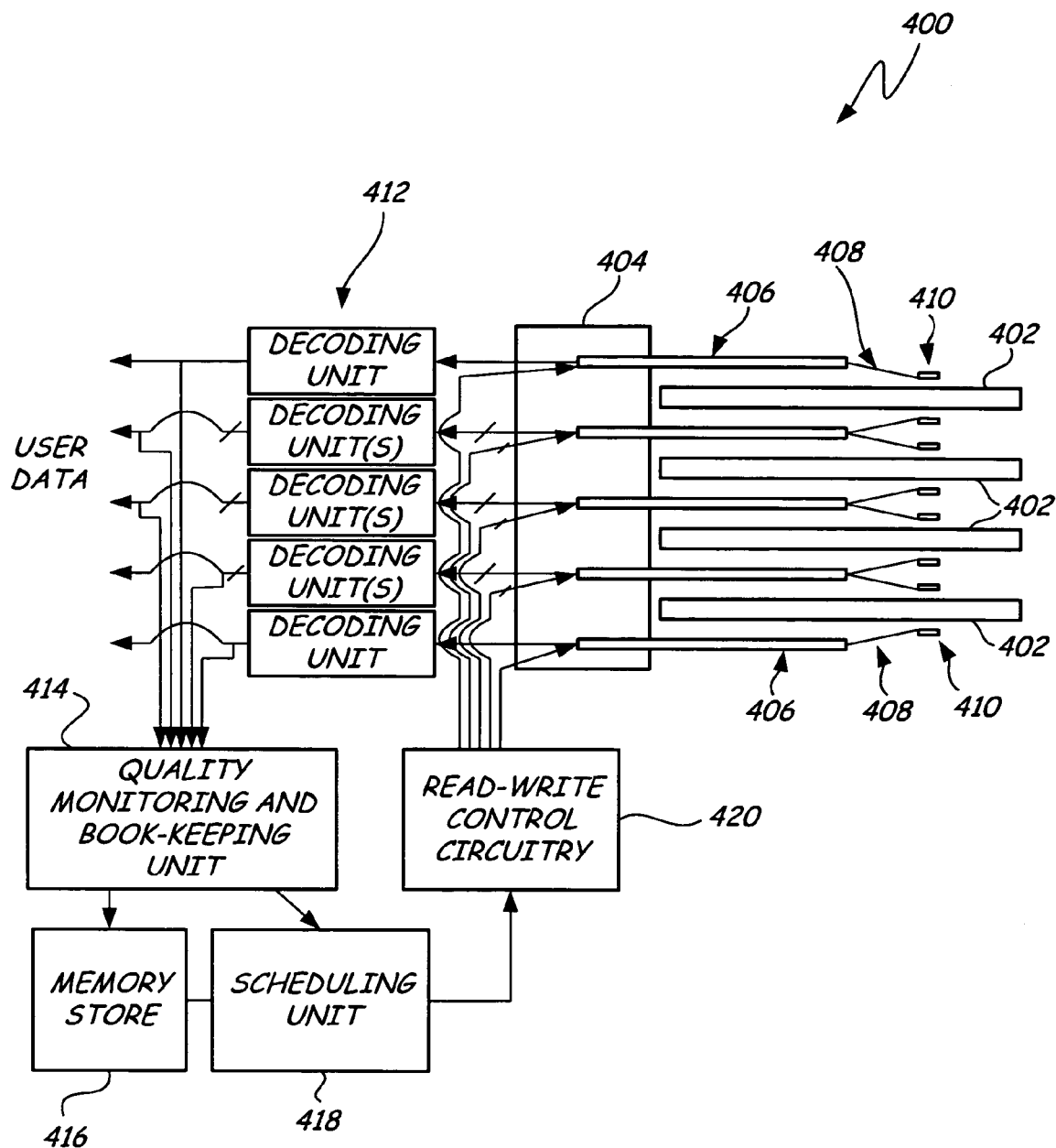
FIG. 4 is a simplified block diagram of a multi-platter storage device, such as the storage device of FIG. 1, with read-write mechanisms scheduling according to an embodiment of the present invention.

FIG. 4 is simplified block diagram of a portion of a disc drive system 400 with read-write monitoring and scheduling features according to an embodiment of the present invention. The disc drive system 400 includes a plurality of rotatable discs 402 arranged in a disc pack (such as disc pack 106 in FIG. 1), an actuator 404, a plurality of track accessing arms 406, a plurality of suspensions 408 with associated read-write mechanisms 410 (disposed on a disc-head slider), decoders 412, a quality monitoring and book-keeping unit 414, a memory unit 416, a scheduling unit 418, and a read-write control circuit 420.

Each of the plurality of read-write mechanisms 410 is associated with one surface of one disc of the plurality of rotatable discs 402. A decoder 412 is coupled to each of the read-write mechanisms 410 to decode data read from the rotatable disc 402 into user data. The quality monitoring and book-keeping unit 414 monitors the decoded user data signal for at least one performance parameter associated with the read-write mechanisms 410, such as signal strength deterioration, number of errors, minimum path metrics, and the like. Results from the quality monitoring and book-keeping unit 414 are stored in the memory unit 416 (which can be part of the quality monitoring and book-keeping unit 414) for tracking the operational reliability of each read-write mechanisms 410. The scheduling unit 418 is adapted to use the stored results to schedule the read-write mechanisms 410. The read-write control circuitry 420 then activates the particular read-write mechanisms 410 to read/write data to the associated rotatable disc 402 according to the output from the scheduling unit 418. The read-write control circuitry 420 can also select from available read-write mechanisms 410 according to the output from the scheduling unit 418 and to a desired quality of service. Thus, a particular operation requiring a high guarantee of service can select the highest ranked read-write mechanisms 410 from the output of the scheduling unit 418.

In general, the quality monitoring and book-keeping unit 414 monitors the decoded signal generated by the decoder 412 for each read-write mechanism 410 during operation. Over time, the quality monitoring and book-keeping unit 414 stores quality metrics in the memory unit 416 for each read-write mechanism 410, and develops a quality factor for each read-write mechanism 410. The scheduling unit 418 ranks the various read-write mechanisms 410 according to their associated quality factor, and schedules the use of the read-write mechanisms 410 based on the QoS desired for the data to be written and based on the ranking of the read-write mechanisms 410.

Figure 5:
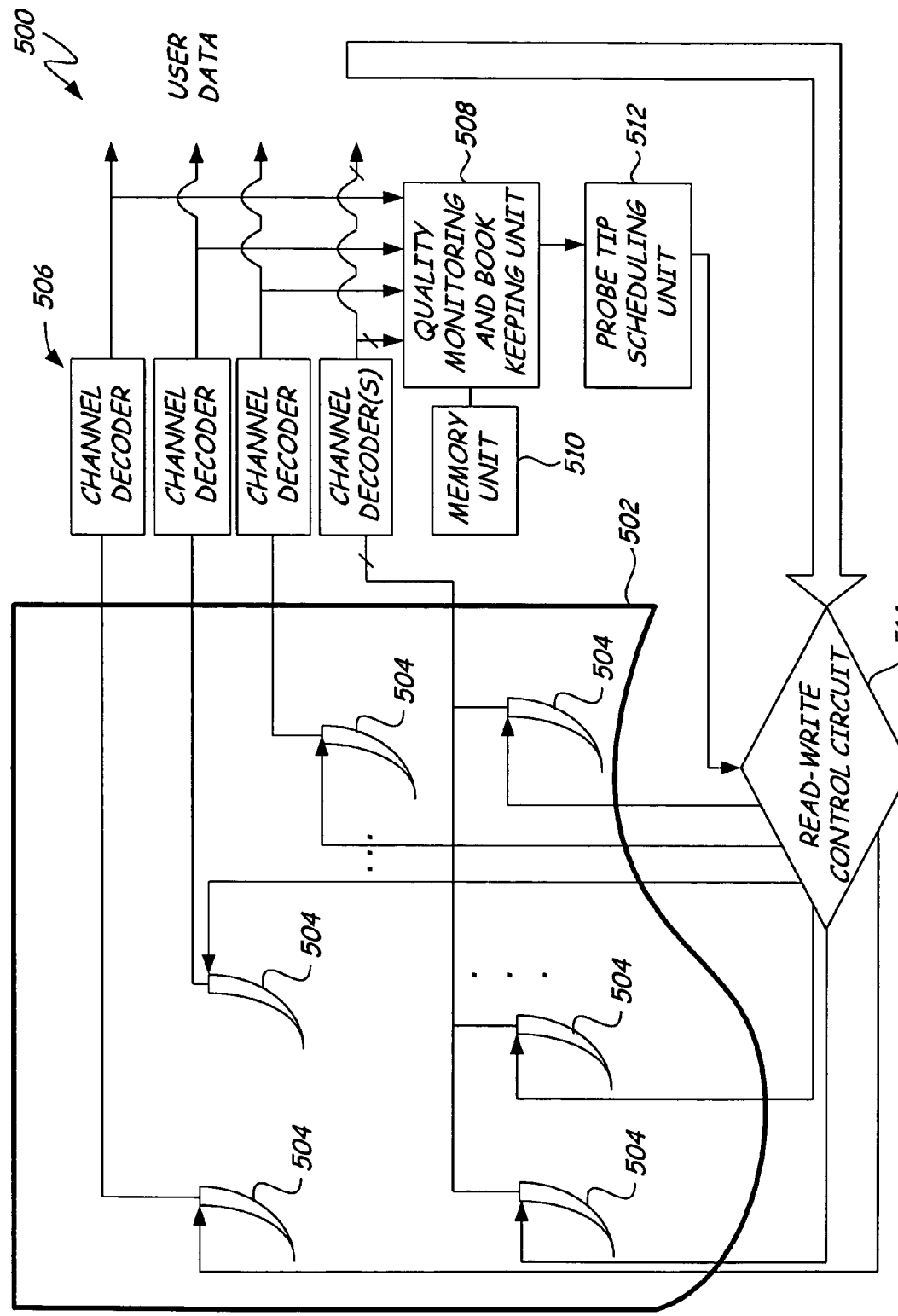
FIG. 5 is a simplified block diagram of a probe storage device with probe tip scheduling according to an embodiment of the present invention.

FIG. 5 is a simplified block diagram of a probe storage device 500 with probe tip scheduling according to an embodiment of the present invention. The probe storage device 500 includes a storage medium 502, a plurality of probe tips 504, channel decoders 506, a quality monitoring and book-keeping unit 508, a memory unit 510, a probe tip scheduling unit 512, and a read-write control circuit 514. The probe tips 504 are adapted to read data from and to write data to the storage medium 502. Each probe tip 504 is coupled to a channel decoder 506. Each channel decoder is adapted to decode data, which is read from the storage medium 502 by a probe tip 504, into user data. The quality monitoring and book-keeping unit 508 monitors the decoded data signal and records quality metrics for each of the probe tips 504 in memory unit 510. After a period of operation, the quality monitoring and book-keeping unit 508 calculates for each probe tip 504 a quality factor, which is also stored in memory unit 510. The probe tip scheduling unit 512 ranks the probe tips 504 according to their associated quality factors and schedules the use of the probe tips 504 according to the desired policy. Finally, the read-write control circuit 514 activates the probe tips 504 to read and/or to write data according to the output of the scheduling unit 512.

As previously mentioned, the read-write mechanism of the storage device, whether it is a probe tip-based device, a magnetic read-write mechanisms-based device, or any other type of storage device, can experience wear and tear. For probe storage devices, such as probe storage device 500, the signal and noise characteristics are closely related to the size of the probe tip 504, the shape of the probe tip 504, and proximity of the probe tip 504 to the media. For example, wear of a probe tip 504 can result in a significantly larger tip size. Consequently, signals from neighboring tracks on the storage medium 502 can interfere with the decoding of a current track. By scheduling probe tips 504 based on its associated quality factor, problems associated with wear and tear of the probe tips 504 can be avoided.

Figure 6:
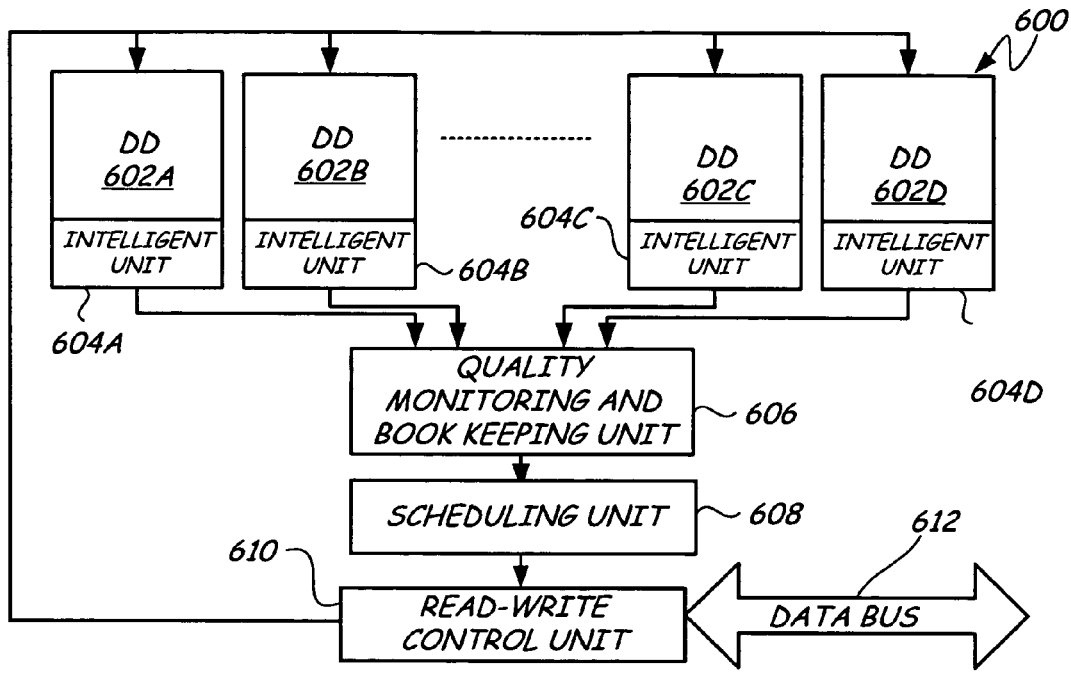
FIG. 6 is a simplified block diagram of a raid storage system with storage unit scheduling according to an embodiment of the present invention.

FIG. 6 is a simplified block diagram of a redundant array of inexpensive discs (RAID) storage system 600 with storage unit scheduling according to an embodiment of the present invention. The RAID storage system 600 includes a plurality of data drives 602A-602D. Each data drive 602A-602D is coupled to a corresponding intelligent unit 604A-604D. The RAID storage system 600 also includes a quality monitoring and book-keeping unit 606, a scheduling unit 608, a read-write control unit 610, and a data bus 612.

Generally, the intelligent unit 604 senses the operational reliability of its associated data drive 602 and identifies the state of the data drive 602. The quality monitoring and book-keeping unit 606 monitors the individual operational reliability of each data drive 602. The scheduling unit 608 ranks each data drive 602 according to its determined operational reliability and schedules the data drives 602 according to a desired level of quality. The read-write control unit 610 writes data to the data drives 602 according to the output of the scheduling unit 608. For example, the scheduling unit 608 can be configured to generate an output of the data drives 602 that have an operational reliability (or quality factor) that is above a predetermined threshold. The read-write control unit 610 can then write to the listed drives. If the quality monitoring information indicates that the associated drive is deteriorating, then the quality monitoring and book-keeping unit 606 can instruct the read-write control unit to move critical information from the deteriorating drive (for example, data drive 602A) to one or more of the other more reliable data drives (such as data drives 602B-602D). Alternatively, the read-write control circuit 610 can be adapted to utilize different error correction coding (ECC) schemes for data written to the deteriorating data drive. In one embodiment, the read-write control unit 610 can be adapted to move information from the deteriorating drive to another drive. Finally, the scheduling unit 608 can be adapted to use a variety of scheduling schemes, depending on the specific application and the importance of the data for a given application.

While the RAID storage system 600 is depicted as having four data drives 602A-602D, it should be understood that any number of data drives 602 can be included. The quality monitoring and book-keeping unit 606 is adapted to monitor each of the available data drives 602 based on information from their associated intelligent unit 604. Additionally, the scheduling unit 608 is adapted to schedule data drive use among any number of available data drives 602.

Figure 7:
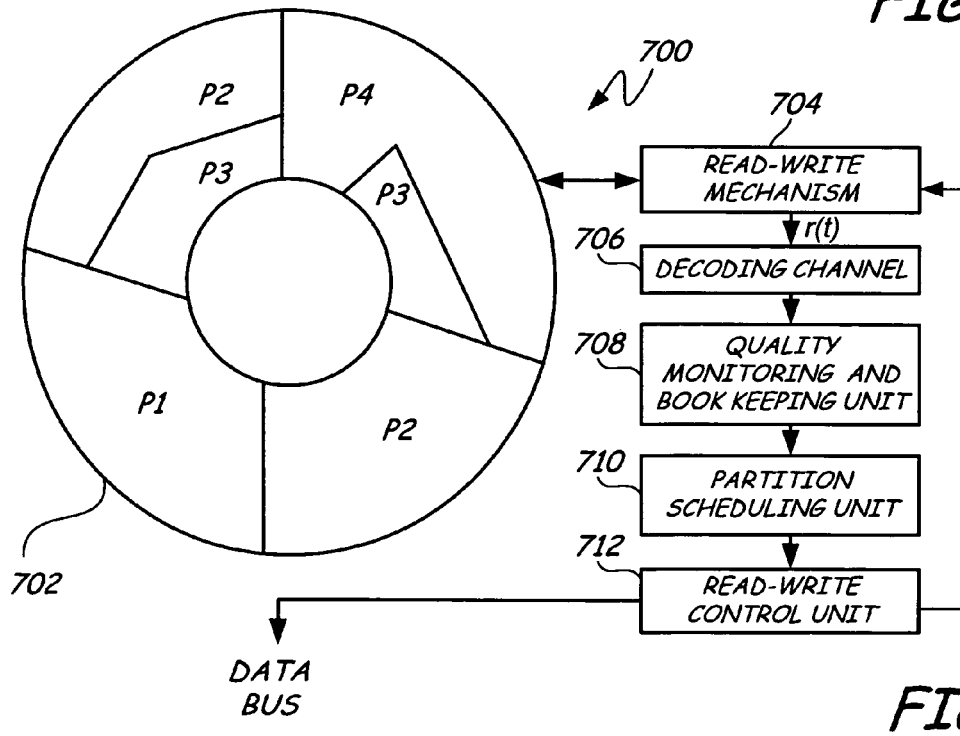
FIG. 7 is a single platter storage system with platter partitioning according to an embodiment of the present invention.

FIG. 7 is a single platter storage system 700 with platter partitioning according to an embodiment of the present invention. The single platter system 700 includes a storage medium 702, which is partitioned into six disjoint physical regions that correspond to four functional partitions (P1, P2, P3 and P4). The single platter storage system 700 also includes a read-write mechanism 704, a channel decoder 706, a quality monitoring and book-keeping unit 708, a partition scheduling unit 710, and a read-write control unit 712.

It should be understood by workers skilled in the art that the storage medium 702 can be divided into any number of partitions, which can be distributed in any arrangement on the storage medium 702. These partitions (P1-P4) can be defined on the storage medium 702 of the single platter storage system 700 when the storage system 700 is manufactured, for example, during a post-assembly defect scanning process. Additionally, quality of the partitions (P1-P4) of the storage medium 702 can be identified during operation, and the quality monitoring and book-keeping unit 708 can calculate a quality factor for each partition. The partition scheduling unit 710 can then schedule a partition (P1, P2, P3, or P4) based on a desired QoS or based on a scheduling algorithm. In this instance, each partition (P1-P4) is treated as an independent unit.

First, the read-write mechanism 704 reads data from the storage medium 702. The channel decoder 706 processes the readback signal r(t) corresponding to a data sector at a particular position on the storage medium 702. The quality monitoring and book-keeping unit 708 monitors the operational reliability of the particular region and position from which the data is read. The partition scheduling unit 710 updates the schedules of the existing partitions (P1-P4) and/or identifies a new functional partition according to the reliability of the particular location. Finally, the data is provided to the read-write mechanism 704 by the read-write control unit 712 for writing to a selected partition (P1, P2, P3, or P4), according to a scheduling algorithm.

Figure 8:
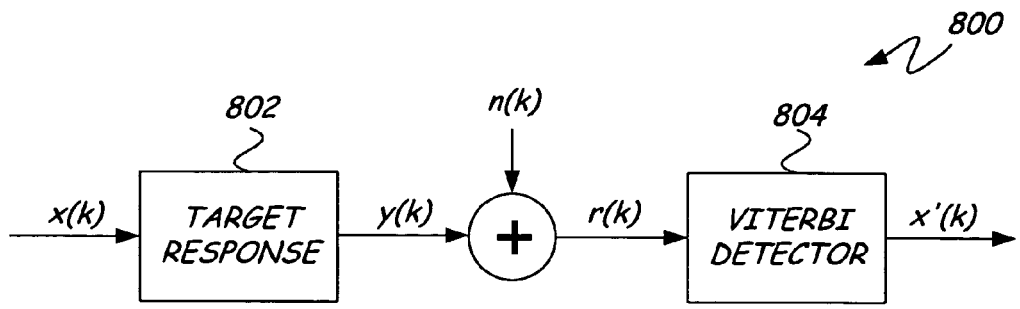
FIG. 8 is a simplified example block diagram of a detection system.

FIG. 8 is an illustrative, simplified example block diagram of a detection system 800. The detection system 800 includes a target response filter 802 and a Viterbi detector 804. A data signal x(k) is convolved to a target by the target response filter 802, resulting in a convolved output signal y(k). The output signal y(k) and channel noise n(k) combine to form a readback signal r(k), which is processed by the Viterbi detector 804 to estimate an output sequence x'(k) that is representative of the data signal x(k).

Generally, SNR degradation of read-write mechanisms can be detected by identifying an amplitude reduction in the readback signal r(k), whether the read-write mechanism is a probe tip, a magnetic read-write mechanism, or another read-write device adapted to read and write data to a storage medium. It is assumed that the received readback signal r(k) contains inter-symbol interference (ISI) noise. The following discussion is based on a system, such as that shown in FIG. 8, where the target response filter 802 uses a normalized version of [1 2 1] (i.e., 0.41 0.82 0.41]) as the fixed equalizer target response. The Viterbi detector 804 applies a Viterbi algorithm corresponding to that target response.

It is assumed that the noise source n(k) in the system is additive white Gaussian noise (AWGN), which is added at the input of the detector. The standard deviation σ of AWGN can be found using the following expression:

$$\sigma = \sqrt{\frac{E_s}{10^{SNR_e/10}}}$$

where $E_s$ is the energy of the target response, which is unity as with the normalized the target response, and $SNR_e$ corresponds to the electronics noise SNR in the system.

Figure 9:
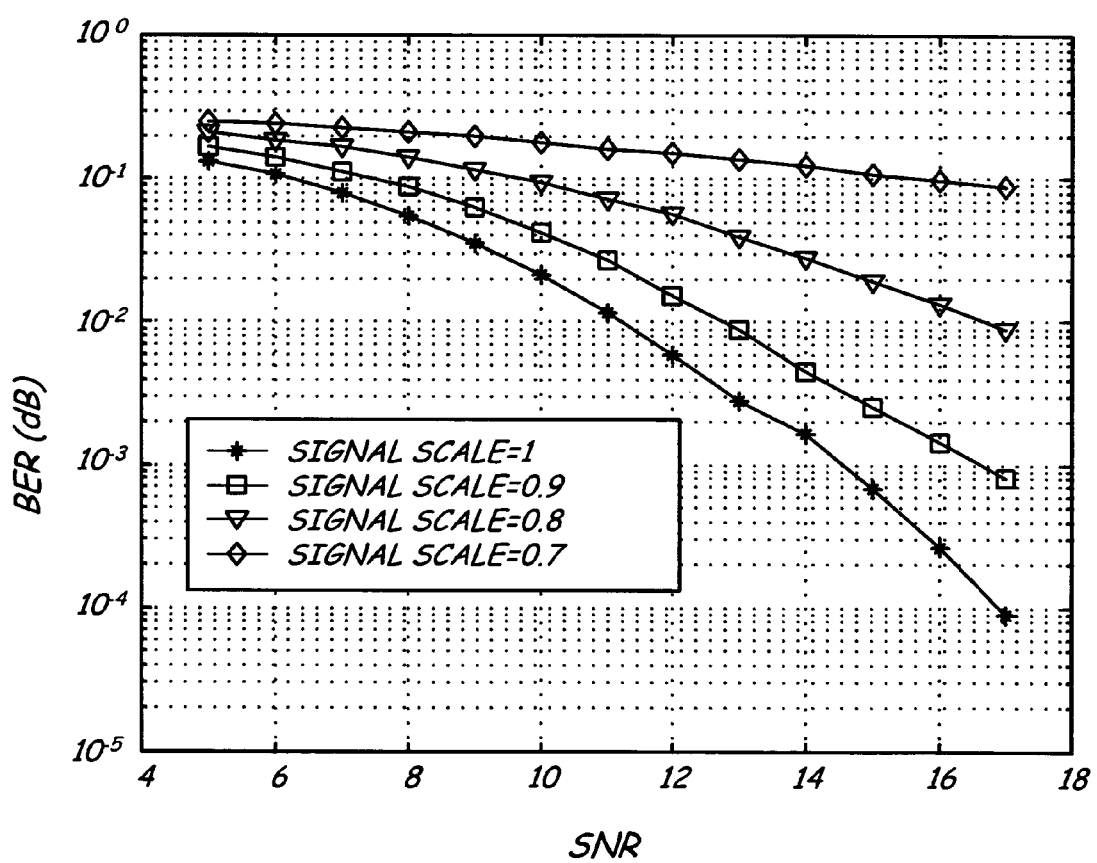
FIG. 9 is a log graph of bit error rate (BER) versus signal-to-noise ratio (SNR) performance for different signal scales.

FIG. 9 is a log graph of BER versus SNR performance of an embodiment of the present invention for different signal scales, corresponding to different amounts of wear and tear associated with probe tips. The wear and tear of the read-write mechanism can be modeled using signal amplitude reduction. More specifically, the target response [0.41 0.82 0.41] is multiplied by a signal scale, ranging from 0 to 1. For example, if there is no wear and tear on the read-write mechanism or the storage medium, the value of the signal scale is one. By contrast, if the read-write mechanism is not functioning at all, the signal scale receives a value of zero. As expected, the wear and tear significantly affects the system performance. At an SNR of approximately 17 on a linear scale, the storage device experiences a BER of approximately $9 \times 10^{-5}$ BER for a read-write mechanism having no wear and tear (signal scale equal to one). However, each 0.1 reduction in the signal scale costs approximately one decade in terms of the BER. Thus, at a wear and tear value of 0.9, the BER is approximately $8.5 \times 10^{-4}$.

To determine the signal scale, the methods described with respect to FIG. 2 were applied. For example, the special mark was set to be the following bit sequence 1 1-1-1 1 1-1-1-1-1 1 1-1-1-1 1 1 1 1 1-1-1-1-1-1 1 1, which has a length of 27 bits. The SNR is taken to be 17 dB and the special marks are read 1000 times. The number of errors are tabulated.

Figure 10:
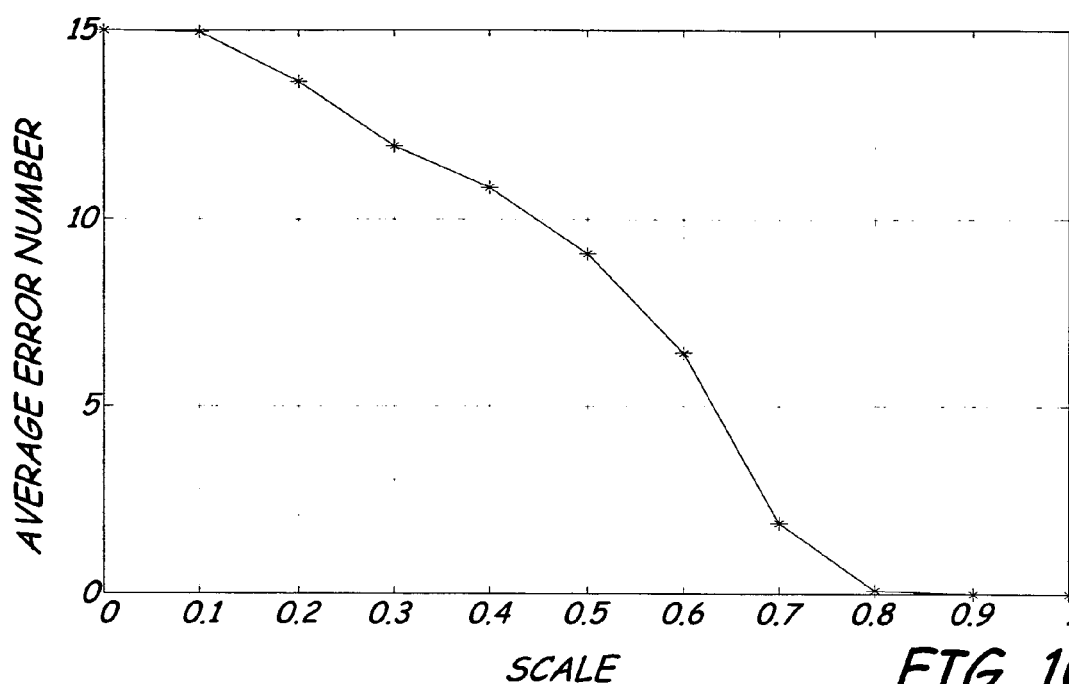
FIG. 10 is a graph of an average number of errors within a special mark versus signal scale for signal-to-noise ratio equal to 17 dB according to an embodiment of the present invention.

FIG. 10 is a graph that illustrates the average number of errors within the special mark as a function of signal scale according to an embodiment of the present invention. When the signal scale is between 0.8 and 1, the average number of errors is approximately zero. When the signal scale is 0 or 0.1, there is an average of approximately 15 errors in the special mark. Thus, it is easy to differentiate a case where the read-write mechanism has no wear and tear from a case where the read-write mechanism has severe wear and tear. However, on this scale, it is relatively difficult to distinguish cases where the read-write mechanism has intermediate wear and tear. However, by exploiting the path metrics of the Viterbi detector, it is possible to differentiate the cases much more precisely, making it possible to rank the operational reliability of the read-write mechanisms.

Figure 11:
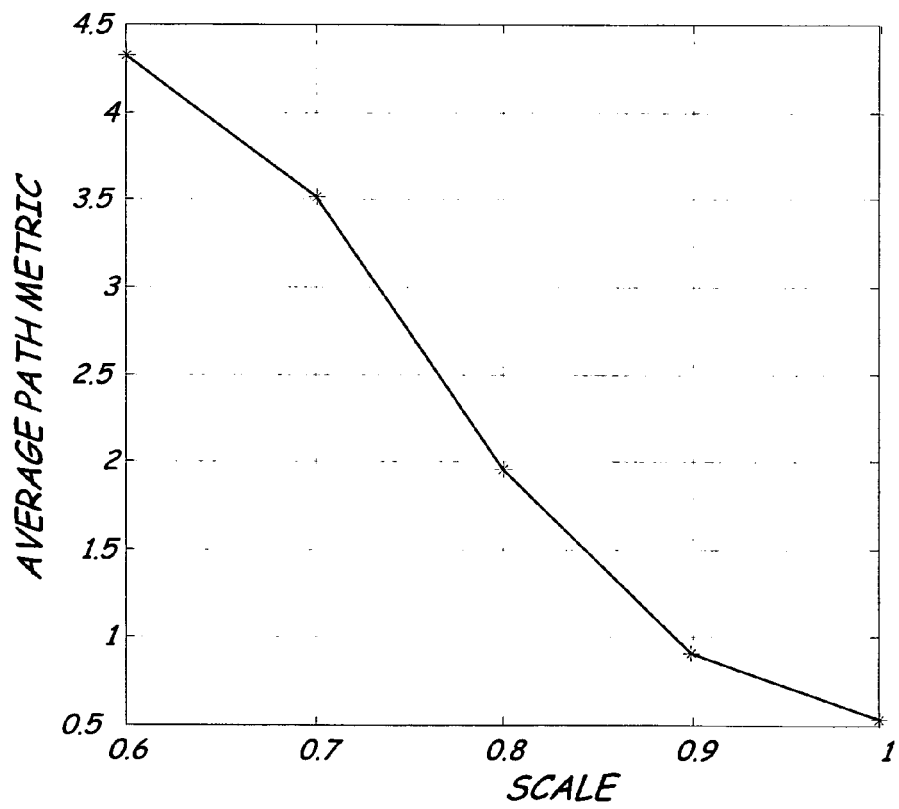
FIG. 11 is a graph of average path metric versus signal scale for SNR equal to 17 dB according to an embodiment of the present invention.

FIG. 11 is a graph of average path metric at the end of the special mark as a function of signal scale for an embodiment of the present invention with SNR equal to 17 dB. In this instance, the average path metric changes fast as the value of the signal scale decreases from 1 to 0.6. Thus, while it is difficult to distinguish between 0.6 and 1 in terms of the average number of errors (as shown in FIG. 10), the average path metric provides a means for identifying the operational quality for the signal scale between 0.6 and 1.

Figure 12:
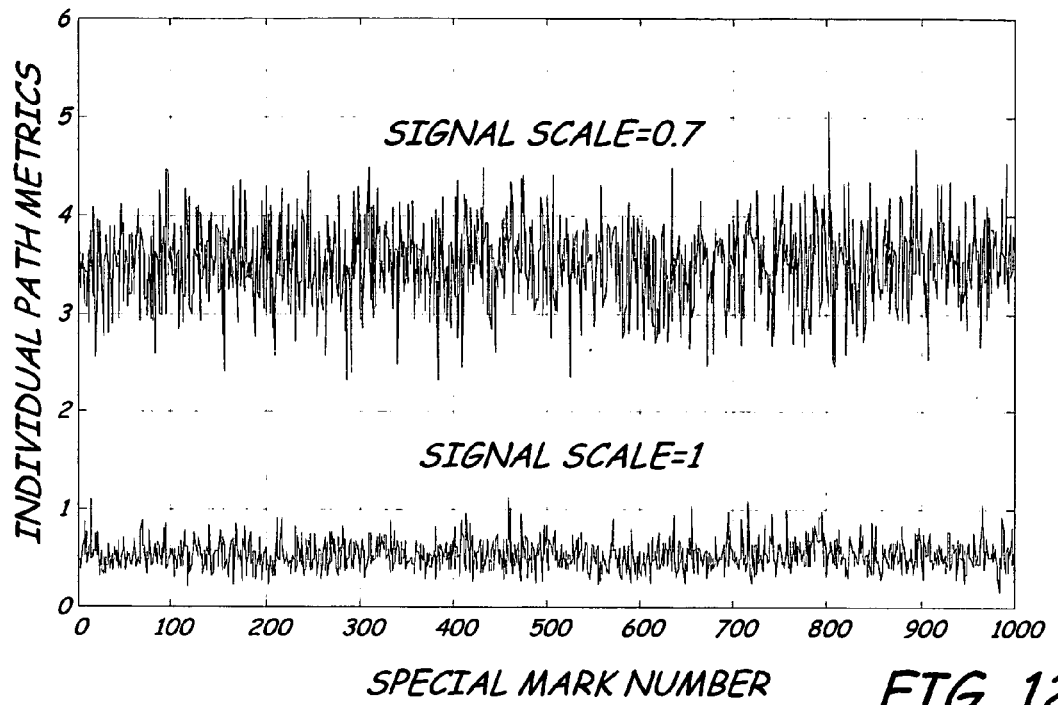
FIG. 12 is a graph of individual path metrics distributions for no wear and tear case and for a 30% wear and tear case versus a special mark number at a SNR equal to 17 dB.

FIG. 12 is a graph of values of the individual path metrics for a read-write mechanism having different wear and tear values versus a special mark number for an SNR of approximately 17 dB. Generally, the distributions of the individual path metrics for a read-write mechanism with no wear and tear (signal scale=1) has an average path metric that is between zero and one. The mean and standard deviations of the path metric values for the no wear and tear case is 0.5373 and 0.1490, respectively. By contrast, a read-write mechanism with 30 percent wear and tear (signal scale=0.7) has a mean of about 3.5127 and a path metric deviation of about 0.4094. The separation between the distributions provides a good indicator of wear.

Figure 13:
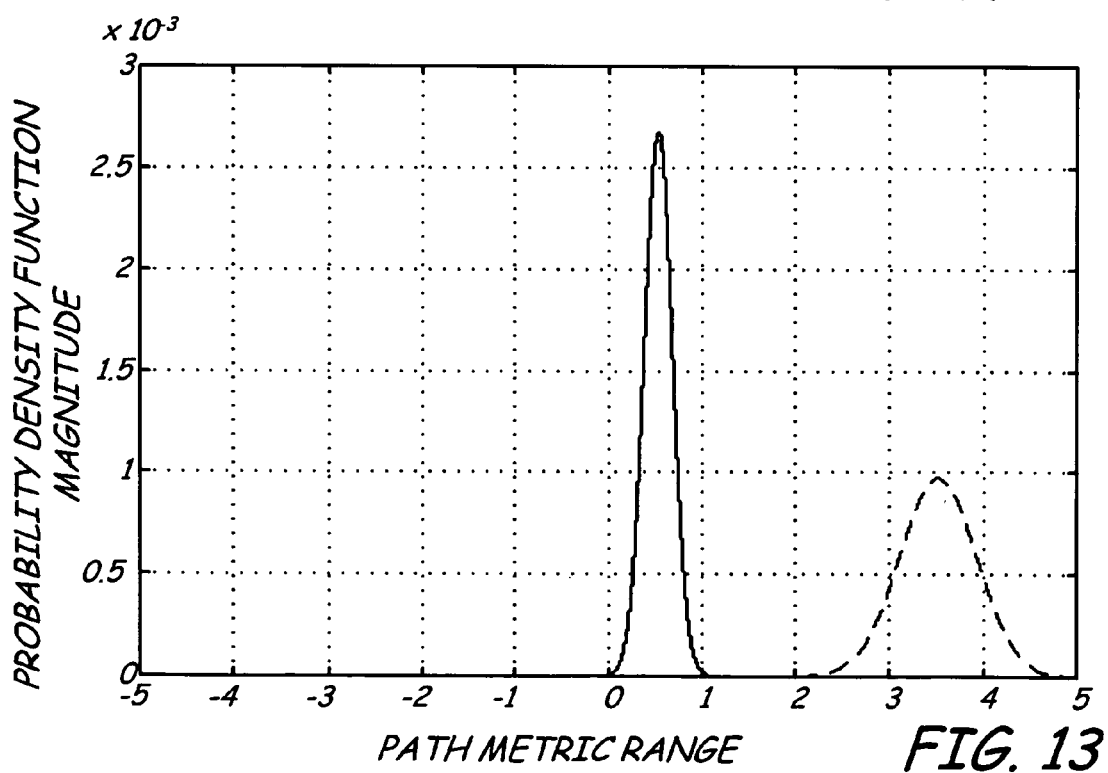
FIG. 13 is a probability density function magnitude versus path metric range graph of path metrics corresponding to signal scale equal to 1 and signal scale equal to 0.7 at an SNR equal to 17 dB according to an embodiment of the present invention.

FIG. 13 is a graph of probability density functions (PDFs) for the values shown in FIG. 12, assuming a Gaussian PDF distribution. The graph is a probability density function magnitude versus path metric range corresponding to signal scale equal to 1 and signal scale equal to 0.7 at an SNR equal to 17 dB. The task of distinguishing between a signal scale of 1 and a signal scale of 0.7 is a classical detection problem. For example, it is possible to compare the average path metric for a read-write mechanism to a threshold of 1.35 (where the two probability density functions have approximately the same value). If the path metric is larger than 1.35, it can be detected as having more than 30 percent wear and tear. Otherwise, it could be assumed that there is no obvious wear and tear, particularly if a desired QoS would permit wear and tear of up to about 30 percent.

Moreover, the probability of misjudgment can be estimated straightforwardly. For example, given that the read-write mechanism has approximately 30 percent wear and tear, the probability that read-write mechanism is misclassified as having no wear and tear is approximately $6.52 \times 10^{-8}$. On the other hand, given the read-write mechanism has no wear and tear, the probability that it will be misclassified as having 30 percent wear and tear is approximately $2.30 \times 10^{-8}$. These misjudgment values can become significantly lower if average path metric values are used to compare with the threshold (after a certain number of access times). In general, the threshold value and the associated misjudgment probabilities highly correlate with the system characteristics, such as typical SNR values, noise mixtures, and the like. Depending on the desired QoS, the system can be initialized such that the values are set according to the systems typical behavior and the desired scheduling policy.

For example, if the quality factor Q(i) assumes discrete values 1, 0.7, and 0, the quality factor Q(i) can correspond to signal scale factor (C) having values within one of three ranges: $0.7<C\leqq1$; $0.5<C\leqq0.7$; and $0\leqq C\leqq0.5$, respectively. A quality factor Q(i) can then be assigned to each read-write mechanism (i) as follows. If the average number of special mark errors for a particular read-write mechanism is greater than 9, the quality factor Q(i) for the read-write mechanism is assigned as zero. If the average number of special mark errors is less than 9 and the average path metric in the Viterbi detector for special mark is larger than 1.35, the quality factor Q(i) for the read-write mechanism is assigned as 0.7. If the average number of special mark errors is less than 9 and the average path metric is less than 1.35, the quality factor Q(i) for the read-write mechanism is assigned as 1. Subsequently, the quality factor Q(i) values can be exploited according to the desired read-write mechanism scheduling policy. In one embodiment, the scheduling unit can be adapted to move data associated with read-write mechanisms that have a lower Q value to other read-write mechanisms with higher Q values, thereby improving the overall QoS of the system. In another application, usage of read-write mechanisms with Q values below a predetermined threshold value (for example, below a threshold value of 1) can be prohibited using the scheduling unit. Such a scheduling policy avoids utilizing read-write mechanisms that have degraded, thereby helping to prevent permanent data loss.

While the present invention has been described with respect to specific storage device implementations, it should be understood by workers skilled in the art that the quality monitoring and book-keeping features of the present invention can be implemented on any channel detection system or any storage device. Additionally, though present invention has been described with respect to Viterbi-type channel decoders, the systems and methods of the present invention can be implemented with any type of channel decoding scheme. Finally, though various techniques for identifying a quality factor for each read-write mechanism are described above, it should be understood that any algorithm for calculating a quality factor can be utilized. In a preferred embodiment, the quality factor determination allows the system to distinguish between levels of deterioration.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the QoS-guaranteed storage device system while maintaining substantially the same functionality without departing from the scope and spirit of the present invention. In addition, although the preferred embodiment described herein is directed to a storage device system for guaranteeing a desired QoS by monitoring an operational quality for each read-write mechanism and by scheduling read-write mechanisms for use based on the operational quality, it will be appreciated by those skilled in the art that the teachings of the present invention can be applied to any type of channel detection system that can experience physical deterioration over time, without departing from the scope and spirit of the present invention.

What is claimed is:

1. A storage device comprising:
    a storage medium;
    a plurality of read-write mechanisms coupled to the storage medium;
    a quality monitoring and book-keeping unit coupled to the plurality of read-write mechanisms and adapted to monitor at least one performance parameter detected in data read-back from the storage medium with each read-write mechanism during operation; and
    a scheduling unit coupled to the quality monitoring and book-keeping unit, the scheduling unit adapted to rank each of the plurality of read-write mechanisms according to the at least one performance parameter and to responsively schedule use of a read-write mechanism according to its rank.

2. The storage device of claim 1 wherein the quality monitoring and book-keeping unit is adapted to calculate a quality indicator representative of the at least one performance parameter and wherein the scheduling unit ranks each of the plurality of read-write mechanisms according to the quality indicator.

3. The storage device of claim 2 wherein the quality monitoring and book-keeping unit further comprising:
    a memory for storing the at least one monitored performance parameter and the representative quality indicator for each read-write mechanism.

4. The storage device of claim 3 wherein the scheduling unit generates a schedule output indicative of a scheduled read-write mechanism, wherein the storage device further comprising:
    read-write control circuitry coupled to the scheduling unit and adapted to use scheduled read-write mechanisms of the plurality of read-write mechanisms based on the schedule output.

5. The storage device of claim 1 wherein the at least one performance parameter comprises a number of errors detected in a plurality of read operations for each read-write mechanism.

6. The storage device of claim 5 wherein the quality monitoring and book-keeping unit calculates a quality indicator for each read-write mechanism based on the at least one performance parameter, wherein the quality indicator comprises an average number of errors.

7. A method for guaranteeing a quality of service in a storage device, the method comprising:
    monitoring a performance parameter detected on data received back from a storage medium with each of a plurality of read-write mechanisms of the storage device using a quality monitoring and book-keeping unit;
    calculating a quality indicator that is representative of the monitored performance parameter for each of the plurality of read-write mechanisms;
    associating each calculated quality indicator to its read-write mechanism; and
    scheduling one or more of the plurality of read-write mechanisms for use using a scheduling unit according to the assigned quality indicator.

8. The method of claim 7 wherein the step of scheduling comprises:
    identifying a subset of the plurality of read-write mechanisms, the subset comprised of read-write mechanisms having an associated quality indicator greater than a threshold value; and
    generating a schedule output using the scheduling unit that identifies one or more read-write mechanisms from the subset for use by a read-write control circuit.

9. The method of claim 7 wherein before the step of scheduling, the method further comprises:
ranking each of the plurality of read-write mechanisms according to the associated quality indicator.

10. The method of claim 7 further comprising:
identifying a read-write mechanism with a quality indicator that is below a predetermined minimum threshold;
moving data from the storage medium associated with the identified read-write mechanism to an available storage medium associated with another of the plurality of read-write mechanisms.

11. The method of claim 10 further comprising:
prohibiting future use of the identified read-write mechanism.

12. The method of claim 7 wherein the step of monitoring comprises:
detecting a special mark within a received signal using each read-write mechanism of the plurality of read-write mechanisms;
determining an operational quality of the read-write mechanism based on the detected special mark; and
storing data associated with the operational quality in a memory.

13. The method of claim 12 and further comprising:
calculating a quality indicator for each read-write mechanism based on the stored data after a period of operation.

* * * * *